United States Patent [19]
Wada

[11] 4,293,514
[45] Oct. 6, 1981

[54] METHOD OF PRODUCING HONEYCOMB STRUCTURAL BODIES CONSISTING OF BARIUM TITANATE SERIES CERAMICS HAVING A POSITIVE TEMPERATURE COEFFICIENT OF ELECTRIC RESISTANCE

[75] Inventor: Shigetaka Wada, Kuwana, Japan
[73] Assignee: NGK Insulators, Ltd., Nagaya, Japan
[21] Appl. No.: 16,832
[22] Filed: Mar. 2, 1979

Related U.S. Application Data

[63] Continuation of Ser. No. 851,705, Nov. 15, 1977, abandoned.

[30] Foreign Application Priority Data

Nov. 26, 1976 [JP] Japan .................................. 51-141093

[51] Int. Cl.³ ............................................. C04B 35/46
[52] U.S. Cl. ........................................ 264/61; 264/63; 264/209.1
[58] Field of Search ........................... 264/63, 61, 209

[56] References Cited

U.S. PATENT DOCUMENTS

| | | |
|---|---|---|
| 3,112,184 | 11/1963 | Hollenbach . |
| 3,682,766 | 8/1972 | Moher . |
| 3,824,196 | 7/1974 | Benbow . |
| 3,927,300 | 12/1975 | Wada et al. ......................... 219/381 |
| 3,943,994 | 3/1976 | Cleveland ............................ 264/56 |
| 4,025,462 | 5/1977 | Cleveland ............................ 264/63 |

FOREIGN PATENT DOCUMENTS 1385907 3/1975 United Kingdom .
1427676 3/1976 United Kingdom .

OTHER PUBLICATIONS

Kingery, *Introduction to Ceramics*, p. 56, 1960.
Du Bois et al., *Plastics*, 1967, Plastics World Price Chart.

*Primary Examiner*—John A. Parrish
*Attorney, Agent, or Firm*—Stevens, Davis, Miller & Mosher

[57] ABSTRACT

A honeycomb structural body consisting of barium titanate series ceramics having a positive temperature coefficient of electric resistance can be obtained by forming a green mass consisting of a mixture of raw material powders containing at least 50% by weight of powders having perovskite type crystal structure and having a specifically limited particle size distribution, water and at least two kinds of organic binders, and drying and firing the formed article. The honeycomb structural body is suitable to be used as a heating element.

6 Claims, No Drawings

METHOD OF PRODUCING HONEYCOMB STRUCTURAL BODIES CONSISTING OF BARIUM TITANATE SERIES CERAMICS HAVING A POSITIVE TEMPERATURE COEFFICIENT OF ELECTRIC RESISTANCE

This is a continuation of application Ser. No. 851,705 filed Nov. 15, 1977 now abandoned.

BACKGROUND OF THE INVENTION (1) Field of the Invention

The present invention relates to a method of producing honeycomb structural bodies consisting of barium titanate series ceramics having a positive temperature coefficient of electric resistance (hereinafter, ceramics having a positive temperature coefficient of electric resistance is referred to as PTC ceramics).

In the remainder of the specification, the term "honeycomb structural body" shall be understood to mean a structural body having a multiplicity of parallel channels extending therethrough, the channels are separated by partition walls which are thin and substantial same in thickness, and having a surface-to-volume ratio in the range of 8 to 40 cm$^2$/cm$^3$.

(2) Description of the Prior Art

There has been disclosed a method of producing a ceramic honeycomb structural body consisting of an insulating ceramic material, for example, cordierite, mullite, alumina and the like, in U.S. Pat. No. 3,824,196 (British Pat. No. 1,385,907) granted on July 16, 1974 to Benbow et al. Further, U.S. Pat. No. 3,927,300 (British Pat. No. 1,427,676) granted on Dec. 16, 1975 to Wada et al discloses a honeycomb structural body consisting of barium titanate series PTC ceramics. However, even when the production method of honeycomb structural body consisting of an insulating ceramic material is merely applied to the production of honeycomb structural bodies consisting of barium titanate series composition, the resulting honeycomb structural bodies do not always have uniform properties.

For example, in the production of cordierite ceramic honeycomb structural body to be used as a catalyst carrier or heat exchanger, raw material can be partly replaced by several to ten several percents of clay in order to give plasticity and good formability to the green mass for forming and to maintain the strength of the formed article from forming to firing and from burning out of the organic binder at the firing to starting of sintering.

However, barium titanate series PTC ceramics consist mainly of BaTiO$_3$, Ba$_{1-x}$Pb$_x$TiO$_3$ or Ba$_{1-y}$Sr$_y$TiO$_3$, which is formed by substituting lead and/or strontium for Ba in BaTiO$_3$, or BaTi$_{1-z}$Sn$_z$O$_3$, which is formed by substituting tin for Ti in BaTiO$_3$, or combinations thereof. Therefore, when a barium titanate series PTC ceramics contain a large amount of SiO$_2$ and/or Al$_2$O$_3$ which are main ingredients of a clay, the ceramics lose their semiconductivity and positive temperature coefficient of electric resistance, and when the amount of SiO$_2$ and/or Al$_2$O$_3$ is excessively large, the ceramics become an insulating body, and ceramics having desired electrical properties cannot be obtained. Accordingly, although the use of a raw material containing not less than several percents of clay can obtain a good formed article or a green mass having a good shape-retention, the raw material cannot be used as a raw material for barium titanate series honeycomb structural body.

An alumina or cordierite honeycomb structural body is a porous body having a water absorption of not less than 20%. That is, alumina or cordierite, after it is formed into honeycomb shape and dried, does not noticeably shrink. Therefore, the honeycomb-shaped formed article can be fired without so much caution. On the contrary, the honeycomb structural body consisting of barium titanate series PTC ceramics must be a high density substance having a water absorption of not higher than 1.0% in order to give a good electric semiconductivity to the ceramics and to make the durability as a heating element high. The barium titanate series ceramic materials shrink more than 50% volume during the firing. Therefore, even when the production method of cordierite or alumina honeycomb structural bodies is merely applied to the production of barium titanate series honeycomb structural body, honeycomb structural bodies having good properties cannot be obtained.

Further, a cordierite or alumina honeycomb structural body, even when it is incorporated with a small amount of iron or alkali from raw material or during the production step of the body, can be used without any trouble, but a honeycomb structural body consisting of barium titanate series PTC ceramics, even when it is incorporated with only several tens ppm of transition metal, such as iron or the like, has a high electric resistance and cannot be used for practical purposes.

SUMMARY OF THE INVENTION

The object of the present invention is to provide a method of producing a honeycomb structural body consisting of semiconductive barium titanate series PTC ceramics and having uniform properties which cannot be produced in a high yield by conventional technics.

That is, the feature of the present invention is the provision of a method of producing a honeycomb structural body consisting of barium titanate series PTC ceramics, comprising preparing raw material powders which are formed into barium titanate series PTC ceramics by firing, which contain at least 50% by weight of powders having perovskite type crystal structure and have a particle size distribution that 5–50% by weight of the raw material powders has a particle size of not smaller than 10 μm and 10–60% by weight thereof has a particle size of not larger than 2 μm, together with water and at least two kinds of organic binders to prepare a green mass, forming the green mass into a honeycomb structural body, drying and firing the body.

DESCRIPTION OF PREFERRED EMBODIMENTS

The present invention will be explained along the production steps.

Raw materials, which are formed into barium titanate series PTC ceramics by firing, for example, BaCO$_3$, TiO$_2$, PbO, SrCO$_3$, Al$_2$O$_3$, SiO$_2$, Sb$_2$O$_3$, MnSO$_4$ and the like, are mixed in a predetermined mixing ratio.

These raw materials are homogeneously mixed by the wet mixing process. The commonly known ball mill process is advantageous for attaining the object of the present invention. As the other wet mixing processes, a mixing process under stirring by screw may be used alone or in combination with the ball mill process.

A homogeneously mixed raw material slurry is dehydrated by a spray drier or filter press and then dried by a drier. The dried raw material powders are calcined as it is, or calcined after it has been pressed into a certain size, or calcined in a rotary kiln. The drying and calcination of raw material powders may be effected simultaneously by means of a high-temperature spray drier.

The object of the calcination is to react a predetermined mixture of raw materials of $BaCO_3$ and $TiO_2$, or $BaCO_3$, $PbO$ and $TiO_2$, or other combination into a compound having perovskite type crystal structure. The reason is as follows. The barium titanate series PTC ceramics obtained by the firing has a perovskite type crystal structure and has a true specific gravity of about 6. While, mixtures of raw materials of $BaCO_3$, $TiO_2$, $SrCO_3$ and the like have a true specific gravity of about 4. In the production of honeycomb structural body, raw material powders are mixed with water and binders in a volume ratio of the total amount of water and binder to the amount of raw material of from 1.2/1 to 2.3/1 to prepare a green mass for forming. Therefore, if a mixture of raw material powders of $BaCO_3$, $TiO_2$, $SrCO_3$, $PbO$ and the like is merely kneaded together with water and binders without calcination to prepare a green mass, the green mass shrinks up to 20–30% of its original volume (volume reduction: 80–70%) by firing to cause deformation and cracks, and honeycomb structural bodies having a complicated shape described later cannot be obtained. In order to prevent this drawback, when raw material powders of $BaCO_3$, $TiO_2$, $SrCO_3$, $PbO$ and the like are previously calcined to change their crystal structure to perovskite type, the volume reduction of the raw material powders by firing can be suppressed to not higher than 70%. That is, the raw material powders must contain at least 50% by weight, preferably at least 70% by weight, more preferably at least 90% by weight, of powders having perovskite type crystal structure.

It is important to prepare a green mass which has a good formability in the extrusion process explained later. A green mass having a good formability can be obtained by selecting proper kind and amount of binders and by the use of raw material powders having a proper particle size distribution. That is, when the particle size of the powders in a green mass is too small, the green mass cannot be kneaded homogeneously, and even if the green mass can be extruded easily, the shaped article is insufficient in the mechanical strength, and is difficult in the handling and further is apt to form cracks in the lattice, that is, partition walls of the channels of the honeycomb body, at the drying. Therefore, it is necessary that at least 5% by weight of the powders in the green mass have a particle size of not smaller than 10 μm. While, when the particle size of raw material powders in a green mass is too coarse, the green mass is insufficient in the plasticity, and the shaped article, after dried, is low in the mechanical strength. Therefore, the amount of raw material powders having a particle size of not smaller than 10 μm contained in the green mass is limited to not more than 50% by weight. In order to obtain raw material powders containing 5–50% by weight of powders having a particle size of not smaller than 10 μm, calcined raw material powders having perovskite type crystal structure are pulverized properly. Moreover, the maximum particle size of the raw material powders must be less than the width of the discharge slit of the extrusion die.

Further, raw material powders must contain 10–60% by weight of powders having a particle size of not larger than 2 μm. The reason is as follows. Powders containing not less than several percents of clay cannot be used as a raw material for the production of barium titanate series PTC ceramics as described above. Therefore, even when raw material powders have a particle size of not larger than 10 μm, if the raw material powders contain less than 10% by weight of fine powders having a particle size of not larger than 2 μm, the shaped article is crushed or cracked within the temperature range from a temperature, at which the organic binder is decomposed, gasified and burned out, to a temperature, at which the article begins to sinter. While, when the raw material powders contain more than 60% by weight of fine powders having a particle size of not larger than 2 μm, the raw material powders are difficult to be homogeneously kneaded or the lattice in the honeycomb is apt to be cracked during the drying as described above.

In order to obtain raw material powders having the above described properties, the following procedures may be adopted. That is, whole starting material is calcined and then pulverized so as to obtain raw material powders having a predetermined particle size distribution. Alternatively, calcined and coarsely pulverized starting material is mixed with uncalcined finely divided starting material so as to obtain raw material powders having a predetermined particle size distribution. Then, raw material powders having the particle size distribution adjusted as described above are kneaded together with water and at least two kinds of organic binders to obtain a green mass for forming, for example, for extrusion. In this case, the green mass for extrusion must satisfy the following conditions that the green mass has a moderate plasticity, that the extruded article has a sufficiently high green strength which does not cause troubles during the operation until drying of the shaped article is finished, that lattice is not cracked during the drying, and that the shaped article does not deform nor is cracked during the firing. In order to obtain a green mass having the above described properties, it is necessary to use at least two kinds of organic binders, preferably at least two kinds of organic binders, which are different by at least 50° C. in the decomposition temperature or weight decreasing temperature between a binder having the highest decomposition temperature or weight decreasing temperature and another binder having the lowest decomposition temperature or weight decreasing temperature. These binders include polyvinyl alcohol, starch (a paper adhesive containing about 80% by weight of water, available under the trademark Yamato-Nori in Japan), cellulose ether, polyalkylene glycol, methyl cellulose, glycerin, and the like. The volume ratio of the total amount of water and organic binder to the amount of raw material powders must be within the range of from 1.2/1 to 2.3/1. When the volume ratio of the total amount of water and organic binder to the amount of raw material powders is less than 1.2/1, the green mass is insufficient in the plasticity and cannot be formed into a predetermined shape. While, when the volume ratio of the total amount of water and organic binder to the amount of raw material powders is higher than 2.3/1, the green mass has a good fluidity, but is poor in the shape-retention and low in the green strength, and is difficult in handling, and further the shaped article is apt to be cracked in the lattice during the drying and is high in the shrinkage during the firing, and hence the shaped article deforms and is cracked at the firing. As the result, excellent honeycomb structural bodies cannot be obtained. The volume ratio of the total amount of water and organic binder to the amount of raw material powders is preferred to be within the range of from 1.8/1 to 2.2/1. The volume ratio of water/organic binder is varied depending upon the kind of organic binder, and the ratio must be determined by try and error. When the volume ratio of water/organic binder is within the range of from 1/0.3 to 1/1.3, a good result is obtained.

Further, in the present invention, the use of at least two kinds of organic binders, which are different by at least 50° C. in the decomposition temperature or weight decreasing temperature between a binder having the highest decomposition temperature or weight decreasing temperature and another binder having the lowest decomposition temperature or weight decreasing temperature, is effective for preventing the shaped article from being cracked or crushed during the firing. That is, organic binders are generally decomposed, softened or melted at a temperature range of 100°–500° C., and then carbonized or gasified to decrease its volume and goes out from the honeycomb structural body. Honeycomb structural body generally has a wall thickness of not more than 0.5 mm, and is low in the mechanical strength until the body is sintered. Therefore, if only one kind of organic binder is used, whole of the binder causes the above described change at a specifically limited temperature and the honeycomb structural body cannot maintain its predetermined shape. However, when at least two kinds of organic binders, which are different by at least 50° C., preferably at least 100° C., in the decomposition temperature or weight decreasing temperature between a binder having the highest decomposition temperature or weight decreasing temperature and another binder having the lowest decomposition temperature and weight decreasing temperature, are used in combination as a binder, and the temperature rising rate is set at a rate of, for example, 100° C./hr, until the binders are burned out at the firing, the shaped article can be fired without causing the above described trouble. For example, a high molecular weight polyether, which is one of polyalkylene glycol derivatives and is available under the trademark Uniloob by Nippon Oil Co., Ltd., is combined with a crystalline cellulose (level-off degree of polymerization cellulose), which is obtained by the hydrolysis of cellulose and is available under the trademark Abisel by Asahi Chemical Industry Co., Ltd., the difference between the weight decreasing temperatures can be at least 100° C. Of course, in the case where three or more kinds of binders are used in combination, when they are different by at least 50° C. in the decomposition temperature or weight decreasing temperature between a binder having the highest decomposition temperature or weight decreasing temperature and another binder having the lowest decomposition temperature or weight decreasing temperature, the object of the present invention can be attained.

The raw material powders, water and the organic binders are mixed by means of a commonly known kneader, if necessary under heating. However, when Fe, Ni, Cr, V and the like are contained in the green mass, the electric resistance of the resulting barium titanate series PTC ceramics increases, and even when the other conditions are same in the production steps, barium titanate PTC ceramics having a predetermined electric resistance cannot be obtained, and therefore incorporation of impurities must be prevented by a sufficient caution. However, materials constituting the machines are always worn more or less during the kneading step, and therefore materials, which do not influence the physical properties of the resulting PTC ceramics even in the incorporation of several tens ppm of the materials into the ceramics, are used. These materials are, for example, aluminum, aluminum alloy, titanium, titanium alloy, TiC, WC and $Al_2O_3$ porcelain having excellent abrasion resistance. The above described metals or alloys can be used in the form of hard chrome plated metals or alloys having low friction resistance. Of course, these materials can be used alone or in combination.

Honeycomb structural bodies can be produced by a method, wherein wave-shaped porous materials are impregnated with raw material slurry, and the impregnated porous materials are rolled; a method, wherein an extruded hollow cylindrical bodies are bundled; a method, wherein ceramic batch is press molded; and other methods. However, the extrusion process described in the above described U.S. Pat. No. 3,824,196 is suitable for the production of an article having at least 4 channels per unit cross-sectional area and an open frontal area of at least 50%, which article is practically useful as a honeycomb structural body. The extrusion process is more suitable process for mass production than other processes, and can produce extruded articles having an open frontal area of at least 50% and at least 4 channels/$cm^2$ of cross-sectional area. Materials for constituting the de-airing pugmill used as an extruder must be selected similarly to the case of kneader. As the die used for obtaining honeycomb structural body and arranged on the extruder, the die described in the above U.S. Pat. No. 3,824,196 can be used.

The extruded body having honeycomb shape is cut into a predetermined length. The predetermined length means a length, by which the extruded body can be easily handled and can be uniformly dried at the drying. The predetermined length is generally within the range of 80–300 mm. The article thus obtained can be dried by leaving it in the air, or by freeze-drying, blast drying which is blowing air into channels, dielectric drying and the like. It is important to take care in the drying that the interior of the shaped article is substantially uniformly dried. When the shaped article is dried by leaving it in the air, the drying velocity at the outer circumferential surface and both ends is different from that in the interior thereof, and hence the shaped article is liable to be cracked. Accordingly, when the shaped article is dried by leaving it in the air, it is necessary that the temperature of the drying room is controlled so that the temperature is low at the beginning of drying and is gradually highered. The freeze-drying process requires an expensive apparatus and a long drying time, and therefore the freeze-drying process is not suitable for mass production. The blast drying process and dielectric drying process can dry the shaped article uniformly and rapidly and are suitable for mass production. Particularly, the dielectric drying process is suitable for drying honeycomb structural body consisting of barium titanate series PTC ceramics. That is, raw material powders, whose crystal structure has been changed into perovskite type by calcination, are ferroelectric substances, and therefore the shaped honeycomb structural body contains ferroelectric powders and is high in absorption efficiency for high frequency energy due to their high dielectric constant and dielectric loss, and can be uniformly and rapidly dried. It is necessary to regulate the flow rate and temperature of air in the blast drying process, and it is important in order to prevent nonuniform drying that air is flowed through the channels of the honeycomb article at a rate of at least 50 cm/sec, preferably within the range of from 50 cm/sec to 10 m/sec until the water content of the article becomes not more than 5% by weight. It is necessary that the temperature of air is not higher than 40° C. at the initial stage of drying in order to keep the drying velocity moderate and to prevent the lattice from being cracked during the drying.

In the latter period of drying, the temperature of air can be high so long as the organic binder does not substantially decompose.

Further, the dielectric drying process and blast drying process may be used in combination.

The dried article is fired as it is or fired, after it has been cut into a predetermined length, at 1,280°–1,350° C., preferably 1,300°–1,330° C. The saggar can be varied depending upon the dimension of the article. The material for constituting the saggar may be alumina, mullite, cordierite, zirconia refractory and the like. If necessary, powders or setter consisting mainly of $ZrO_2$ are used in order that the article does not react with the saggar. The article may be arranged in the saggar so as that the longitudinal direction of the channels is vertical or horizontal or is inclined at a certain angle with respect to the horizontal line by the setter.

The fired honeycomb structural body is cut, for example, by a diamond cutter or polished by a polisher to obtain a honeycomb structural body having a predetermined dimension. In the cutting and polishing, other commonly used methods may be adopted, if necessary. The honeycomb structural body, which has been worked into a predetermined dimension as described above, is washed and dried, and then is provided with ohmic electrodes on predetermined surfaces, which are generally opposite surfaces having channels.

As the means for providing ohmic electrode on the honeycomb structural body, use may be made of flame spray method, paste baking method, chemical plating method and the like. These methods are disclosed in detail in the above described U.S. Pat. No. 3,927,300 granted to Wada et al, and U.S. Pat. No. 4,032,752 granted on June 28, 1977 to Ohmura et al.

The following examples are given for the purpose of illustration of this invention and are not intended as limitations thereof.

EXAMPLE 1

Raw material powders consisting of 0.9 mol of $BaCO_3$, 0.1 mol of PbO, 1.03 mol of $TiO_2$, 0.02 mol of $SiO_2$ and 0.0015 mol of $Y_2O_3$ were mixed for 12 hours in a ball mill having polyvinyl chloride lining together with given amounts of agate balls and distilled water, and the resulting mixture was dried by means of a spray drier. The dried powder was pressed in a tungsten carbide mold under a pressure of 200 kg/cm² to obtain a disk having a diameter of 50 mm and a height of about 40 mm, and the disk was calcined at 1,050° C. for 3 hours in a mullite saggar. The calcined disk was roughly pulverized by a roll crusher having alumina rolls, and further pulverized by the use of the above described ball mill and dried to obtain calcined raw material powders having perovskite type crystal structure only. In the above described pulverization, the pulverization condition and time were varied, whereby the calcined raw material powders having different particle size distributions shown in the following Table 1 were produced. The particle size was measured according to the Andreasen pipette method.

To 100 parts by weight of the calcined raw material powders were added 5 parts by weight of methyl cellulose sold by Shin-etsu Chemical Co., Ltd. under the trademark Metholose, 4 parts by weight of a high molecular weight polyether sold by Nippon Oil Co., Ltd. under the trademark Uniloob, and 5 parts by weight of a 3% aqueous solution of polyvinyl alcohol, and the resulting mixture was kneaded, while adding water, in a kneader having titanium alloy lining to obtain a green mass having a viscosity and hardness suitable for extrusion process. It can be seen from Table 1 that, only when calcined raw material powders having a particle size distribution that 10–60% by weight of powders has a particle size of not larger than 2 $\mu$m and 5–50% by weight of the powders has a particle size of not smaller than 10 $\mu$m, the formability of the resulting green mass and the properties of the resulting fired honeycomb structural body are excellent.

Further, when powders having perovskite type crystal structure are mixed with uncalcined powders to prepare a mixture containing 50–100% by weight of the calcined powders, the formability of the green mass and the properties of the fired honeycomb structural body are excellent only when the mixture contains 10–60% by weight of powders having a particle size of not larger than 2 $\mu$m and 5–50% by weight of powders having a particle size of not smaller than 10 $\mu$m.

TABLE 1

| Sample No. | Powders having a particle size of not larger than 2 $\mu$m (wt. %) | Powders having a particle size of not smaller than 10 $\mu$m (wt. %) | Properties of extruded article | Properties of fired article | Evaluation |
| --- | --- | --- | --- | --- | --- |
| 1 | 5.1 | 58.6 | Lattice is cracked. Strength of dried article is low. | | Poor |
| 2 | 6.4 | 38.3 | Strength of dried article is low. | Deforms remarkably during the firing. | Poor |
| 3 | 14.2 | 43.7 | Excellent | Excellent | Excellent |
| 4 | 15.6 | 21.3 | Excellent | Excellent | Excellent |
| 5 | 16.6 | 3.9 | Extruded article before drying is too soft. | Deforms fairly during the firing. | Poor |
| 6 | 32.5 | 15.4 | Excellent | Excellent | Excellent |
| 7 | 34.8 | 2.5 | Substantially excellent. | Fired article reacts noticeably with powders used as a setter. | Poor |
| 8 | 51.2 | 14.7 | Excellent | Excellent | Excellent |
| 9 | 57.6 | 6.7 | Excellent | Excellent | Excellent |
| 10 | 65.3 | 13.9 | Lattice is apt to be | Fired article is | Poor |

TABLE 1-continued

| Sample No. | Powders having a particle size of not larger than 2 μm (wt. %) | Powders having a particle size of not smaller than 10 μm (wt. %) | Properties of extruded article | Properties of fired article | Evaluation |
| --- | --- | --- | --- | --- | --- |
| 11 | 71.2 | 1.1 | cracked during the drying. Lattice is cracked during the drying. | cracked and is apt to react with setter. — | Poor |

EXAMPLE 2

Raw material powders having a particle size distribution shown in sample No. 6 of Example 1 were kneaded together with various kinds of organic binders and various amounts of water to prepare various green masses. The resulting green mass was extruded, and the extruded article was dried and fired to obtain a honeycomb structural body. The obtained results are shown in the following Table 2. It can be seen from Table 2 that, only when at least two kinds of organic binders are used, honeycomb structural bodies having excellent properties are obtained. In the above experiments, the amount of water was varied within the range that the volume ratio of the total amount of water and organic binder to the amount of raw material powders was from 1.2/1 to 2.3/1. Further, it can be seen that, when the difference between the decomposition temperature of a binder and that of another binder is more than 50° C., a good result is obtained.

TABLE 2(a)

| Sample No | Kind of organic binder | Difference between the decomposition temperatures of binders (°C.) | Addition amount of organic binder based on 100 parts by weight of raw material powders (parts by weight) | Results | Evaluation |
| --- | --- | --- | --- | --- | --- |
| 12 | Metholose | — | 2.0–7.0 | Honeycomb structural body is deformed during drying. | Poor |
| 13 | Starch (water content: 78%) | — | 5.0–15.0 | Honeycomb structural body is obtained, but is cracked during the drying. | Poor |
| 14 | Polyvinyl alcohol | — | 1.5–5.0 | Honeycomb structural body is obtained, but is deformed during handling. | Poor |
| 15 | Polyox** | — | 0.5–7.0 | Honeycomb structural body is obtained, but is too soft to be handled. When the amount of water is decreased, kneading is impossible. | Poor |
| 16 | Metholose Uniloob | 130 | 3.0–5.0 3.0–5.0 | Good article is obtained and lattice is not cracked. | Excellent |
| 17 | Metholose Uniloob Polynon*** | 130 | 3.0–5.0 3.0–5.0 2.0–5.0 | " | Excellent |

TABLE 2(b)

| Sample No. | Kind of organic binder | *Difference between the decomposition temperatures of binders (°C,) | Addition amount of organic binder based on 100 parts by weight of raw material powders (parts by weight) | Results | Evaluation |
| --- | --- | --- | --- | --- | --- |
| 18 | Polyox** Abisel | 50 | 0.5–7.0 1.0–5.0 | Good article is obtained by the use of a mixture of 4–5 parts of Polyox and 2–3 parts of Abisel. The article is neither deformed nor cracked. | Excellent |
| 19 | Starch (water content: 78%) Glycerin | 35 | 5.0–15.0 5.0–15.0 | Good article is obtained, but the article is cracked during the firing. | Poor |

Remarks:
*Weight decrease of binders is measured at a temperature raising rate of 10° C./min, and the difference between the decomposition temperatures of the binders is shown by the difference between the temperature, at which the weight of one binder is decreased to 50% of its original weight.
**Polyethlene oxide sold by U.C.C. Co.
***Polyethlene glycol fatty acid ester sold by Tetsuno Yuka K.K.

EXAMPLE 3

Raw material powders having a particle size distribution shown in sample No. 6 of Example 1 were kneaded together with a variant amount of the total amount of organic binder and water to prepare various green masses. The resulting green mass was extruded, and the extruded article was dried and fired to obtain a honeycomb structural body. The obtained results are shown in the following Table 3. It can be seen from Table 3 that, only when the volume ratio of the total amount of water and organic binder to the amount of raw material powders is within the range of from 1.2/1 to 2.3/1, honeycomb structural bodies having excellent properties are obtained. In the above experiment, a binder consisting of 4 parts by weight of Metholose, 4 parts by weight of Uniloob, 2 parts by weight of Polynon and 2 parts by weight of polyvinyl alcohol was used.

TABLE 3

| Sample No. | Volume ratio of the total amount of water and binder to the amount of raw material powders | Results | Evaluation |
| --- | --- | --- | --- |
| 20 | 1.0 | Green mass is too hard to be kneaded. Extrusion is impossible through narrower slits. | Poor |
| 21 | 1.2 | Extrusion is possible, but green mass is somewhat hard and extrusion velocity is slow. | Good |
| 22 | 1.5 | Green mass is somewhat hard, but troubles do not occur. | Excellent |
| 23 | 1.8 | There are no troubles in the extruding, drying and firing. | Excellent |
| 24 | 2.1 | There are no troubles in the extruding, drying and firing. | Excellent |
| 25 | 2.3 | Volume reduction during the firing is high, but a good honeycomb structural body is obtained. | Good |
| 26 | 2.5 | Green mass is too soft and extruded article is deformed during the drying. | Poor |

As described above, in the production of the honeycomb structural body consisting of barium titanate series PTC ceramics according to the present invention, raw material powders containing at least 50% by weight of powders having perovskite type crystal structure and having a particle size distribution that 5–50% by weight of the raw material powders has a particle size of not smaller than 10 μm and 10–60% by weight thereof has a particle size of not larger than 2 μm are used as raw material powders for shaping, whereby a green mass having good formability and shape-retention can be obtained without the addition of clay, and the shrinkage of the green mass during the firing can be suppressed. Further, at least two kinds of organic binders are used, whereby the formed honeycomb structural body can be prevented from being cracked, crushed and deformed at the firing in the production of honeycomb structural body. The honeycomb structural body can be used as a heating element and the like, and the present invention is a very useful method for industry.

What is claimed is:

1. A method of producing a honeycomb structural body consisting of barium titanate series ceramics having a positive temperature coefficient of electric resistance, comprising kneading raw material powders, which contain at least 50% by weight of powders having perovskite type crystal structure and have a particle size distribution that 5–50% by weight of the raw material powders has a particle size of not smaller than 10 μm and 10–60% by weight thereof has a particle size of not larger than 2 μm, together with water and at least two kinds of organic binders to prepare a green mass, extruding the green mass into a honeycomb shaped article, drying the extruded article by blowing air through the channels of the honeycomb article at a rate of at least 50 cm/sec until the water content of the article becomes less than 5% by weight wherein the temperature of the air employed is less than 40° C., and firing the dried article, wherein said at least two kinds of organic binder are different by at least 50° C. in the decomposition temperature or weight decreasing temperature between a binder having the highest decomposition temperature or weight decreasing temperature and another binder having the lowest decomposition temperature of weight decreasing temperature.

2. A method according to claim 1, wherein the volume ratio of the total amount of water and the binders to the amount of the raw material powders is within the range of from 1.2/1 to 2.3/1.

3. A method according to claim 2, wherein said volume ratio is within the range of from 1.8/1 to 2.2/1.

4. A method according to claim 1, wherein said difference is at least 100° C.

5. A method according to claim 1, wherein said raw material powders contain at least 70% by weight of powders having perovskite type crystal structure.

6. A method according to claim 5, wherein said raw material powders contain at least 90% by weight of powders having perovskite type crystal structure.

* * * * *